US009756184B2

(12) United States Patent
Barinov

(10) Patent No.: US 9,756,184 B2
(45) Date of Patent: Sep. 5, 2017

(54) SYSTEM AND METHOD OF DISTRIBUTED MAINTENANCE OF CONTACT CENTER STATE

(71) Applicant: GENESYS TELECOMMUNICATIONS LABORATORIES, INC., Daly City, CA (US)

(72) Inventor: Vitaly Y. Barinov, Clayton, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 313 days.

(21) Appl. No.: 13/672,594

(22) Filed: Nov. 8, 2012

(65) Prior Publication Data

US 2014/0126711 A1 May 8, 2014

(51) Int. Cl.
*G06F 15/173* (2006.01)
*H04M 3/51* (2006.01)

(52) U.S. Cl.
CPC ........ *H04M 3/5175* (2013.01); *H04M 3/5183* (2013.01); *H04M 2203/402* (2013.01)

(58) Field of Classification Search
None
See application file for complete search history.

(56) References Cited

U.S. PATENT DOCUMENTS

| | | | |
|---|---|---|---|
| 5,937,051 A | 8/1999 | Hurd et al. | |
| 6,021,428 A * | 2/2000 | Miloslavsky | 709/206 |
| 6,055,308 A * | 4/2000 | Miloslavsky et al. | ... 379/265.03 |
| 6,134,315 A | 10/2000 | Galvin | |
| 6,377,567 B1 | 4/2002 | Leonard | |
| 6,393,472 B1 | 5/2002 | Anerousis et al. | |
| 6,404,883 B1 | 6/2002 | Hartmeier | |
| 6,625,139 B2 | 9/2003 | Miloslavsky et al. | |
| 6,650,748 B1 * | 11/2003 | Edwards et al. | ......... 379/266.04 |
| 6,834,303 B1 * | 12/2004 | Garg et al. | .................... 709/224 |
| 6,868,152 B2 | 3/2005 | Statham et al. | |
| 6,879,586 B2 | 4/2005 | Miloslavsky et al. | |
| 6,985,943 B2 | 1/2006 | Deryugin et al. | |

(Continued)

FOREIGN PATENT DOCUMENTS

EP  2306381 A1  4/2011

OTHER PUBLICATIONS

Anisimov et al., "XML Based Framework for Contact Center Applications," WEBIST—International Conference on Web Information Systems and Technologies, pp. 443-450, 2007.

(Continued)

*Primary Examiner* — Hieu Hoang
(74) *Attorney, Agent, or Firm* — Lewis Roca Rothgerber Christie LLP

(57) ABSTRACT

A system and/or a method of distributed maintenance of contact center state including the state of contact center objects which may include directory numbers and agents. Device controllers and call controllers are used to monitor device and call information. Data aggregation nodes are connected to the device controllers and call controllers. The data aggregation nodes share directory number state information and agent state information via a publish-subscribe bus, and aggregate state information to form full state information.

16 Claims, 8 Drawing Sheets

(56) References Cited

U.S. PATENT DOCUMENTS

| | | | |
|---|---|---|---|
| 7,376,227 B2 | 5/2008 | Anisimov et al. | |
| 7,490,145 B2 | 2/2009 | Sylor et al. | |
| 7,526,540 B2 | 4/2009 | Gopisetty et al. | |
| 7,602,725 B2 | 10/2009 | Vaught | |
| 7,701,925 B1 | 4/2010 | Mason et al. | |
| 7,792,773 B2* | 9/2010 | McCord | H04M 3/5233 706/47 |
| 7,817,796 B1 | 10/2010 | Clippinger et al. | |
| 7,936,867 B1 | 5/2011 | Hill et al. | |
| 8,023,637 B2 | 9/2011 | Irwin et al. | |
| 8,031,860 B2* | 10/2011 | Coussement | 379/265.09 |
| 8,146,000 B1* | 3/2012 | Boliek et al. | 715/748 |
| 8,391,463 B1 | 3/2013 | Kiefhaber et al. | |
| 8,510,807 B1 | 8/2013 | Elazary et al. | |
| 8,588,398 B1 | 11/2013 | Irwin et al. | |
| 8,594,306 B2 | 11/2013 | Laredo et al. | |
| 8,630,399 B2* | 1/2014 | D'Arcy et al. | 379/201.02 |
| 8,634,541 B2 | 1/2014 | Flockhart et al. | |
| 8,675,859 B2 | 3/2014 | Mandalia et al. | |
| 8,701,128 B2* | 4/2014 | Salt et al. | 719/328 |
| 8,719,067 B2 | 5/2014 | Fama et al. | |
| 8,792,633 B2 | 7/2014 | Barinov | |
| 2002/0046273 A1 | 4/2002 | Lahr et al. | |
| 2002/0095462 A1* | 7/2002 | Beck et al. | 709/204 |
| 2002/0110113 A1 | 8/2002 | Wengrovitz | |
| 2002/0156599 A1 | 10/2002 | Oosthoek et al. | |
| 2003/0018702 A1 | 1/2003 | Broughton et al. | |
| 2003/0115317 A1* | 6/2003 | Hickson et al. | 709/224 |
| 2003/0198183 A1 | 10/2003 | Henriques et al. | |
| 2004/0028212 A1 | 2/2004 | Lok et al. | |
| 2004/0044585 A1 | 3/2004 | Franco | |
| 2004/0088315 A1 | 5/2004 | Elder et al. | |
| 2004/0252822 A1 | 12/2004 | Statham et al. | |
| 2005/0154637 A1 | 7/2005 | Nair et al. | |
| 2005/0210262 A1 | 9/2005 | Rolia et al. | |
| 2006/0159027 A1 | 7/2006 | Owens | |
| 2006/0195599 A1 | 8/2006 | Gedik et al. | |
| 2007/0226239 A1 | 9/2007 | Johnson et al. | |
| 2008/0077470 A1* | 3/2008 | Yamanaka | 705/10 |
| 2008/0225804 A1 | 9/2008 | Thubert et al. | |
| 2009/0168991 A1 | 7/2009 | Zgardovski et al. | |
| 2009/0316687 A1* | 12/2009 | Kruppa | 370/352 |
| 2009/0327441 A1 | 12/2009 | Lee et al. | |
| 2010/0002863 A1 | 1/2010 | Loftus et al. | |
| 2010/0020689 A1 | 1/2010 | Tang | |
| 2010/0106710 A1 | 4/2010 | Nishizawa et al. | |
| 2010/0250566 A1 | 9/2010 | Paul | |
| 2010/0293532 A1 | 11/2010 | Andrade et al. | |
| 2011/0055122 A1 | 3/2011 | Andreoli | |
| 2011/0119761 A1 | 5/2011 | Wang et al. | |
| 2011/0227754 A1 | 9/2011 | Hill | |
| 2011/0254732 A1 | 10/2011 | Martin et al. | |
| 2011/0283000 A1 | 11/2011 | McCormack et al. | |
| 2012/0079061 A1 | 3/2012 | Krebs | |
| 2012/0158995 A1 | 6/2012 | McNamee et al. | |
| 2012/0233107 A1* | 9/2012 | Roesch | G06N 5/025 706/47 |
| 2012/0323997 A1 | 12/2012 | Mezhibovsky et al. | |
| 2013/0050199 A1 | 2/2013 | Chavez | |
| 2013/0204959 A1 | 8/2013 | Zhang et al. | |
| 2014/0126713 A1 | 5/2014 | Ristock et al. | |
| 2014/0129617 A1 | 5/2014 | Barinov | |
| 2014/0143294 A1 | 5/2014 | Vitaly | |
| 2014/0143373 A1 | 5/2014 | Vitaly | |
| 2014/0294169 A1 | 10/2014 | Barinov | |

OTHER PUBLICATIONS

Birman et al., "Exploiting Virtual Synchrony in Distributed Systems," ACM, pp. 123-138, 1987.

Anisimov, Nikolay et al., XML Based Framework for Contact Center Applications; WEBIST 2007—International Conference on Web Information Systems and Technologies, 2007, 8 pages.

Birman, Kenneth P. et al., Exploiting Virtual Synchrony in Distributed Systems, Cornell University, ACM, 1987, pp. 123-138.

Hypergraph—Wikipedia, http://en.wikipedia.org/wiki/Hypergraph, as captured on Mar. 29, 2013, 8 pages.

Karypis, G., et al., Multilevel Hypergraph Partitioning: Applications in VLSI Domain, IEEE Transactions on Very Large Scale Integration (VLSI) Systems, vol. 7, No. 1, Mar. 1999, pp. 69-79.

Tanenbaum, Andrew S., Computer Networks, Fourth Edition, 2003, Prentice Hall PTR, 4 pages.

Zoltan Developer's Guide: Quality Program; Zoltan Toolkit, http://www.cs.sandia.gov/zoltan/dev_html/dev_intro_sqe._html, as captured on Mar. 29, 2013, 6 pages.

* cited by examiner

SYSTEM AND METHOD OF DISTRIBUTED MAINTENANCE OF CONTACT CENTER STATE

FIELD

The present invention relates to contact center monitoring systems and methods, and more particularly to scalable systems and methods for maintaining contact center state information.

BACKGROUND

Contact centers may be used by an organization to communicate in an efficient and systematic manner with outside parties. Such centers may for example have large numbers of agents staffing telephones, and interacting with outside parties and with each other. Calls may be placed on hold or into an interactive voice response (IVR) system when first connected to the contact center; subsequently an agent may take a call, place it back on hold, transfer the call, conference in another agent, or take other such actions related to the call.

It may be helpful to the agents or to other members of the organization to have access to information about individual calls or devices, or to obtain statistical information about the operation of the contact center, such as, for example, the average or maximum caller hold time during the previous hour. Such information may also be of use, for example, to contact center systems used to route calls to available agents or to agents qualified to handle a particular issue. A contact center monitoring system which maintains and organizes such information should be able to handle large numbers of calls, agents, and devices, without significant degradation in performance; viz. such a system should be scalable to larger installations without being limited by a performance bottleneck. In particular, a simple approach suitable for a small system, such as maintaining all of the contact center state information in a database, stored in a back-end database server, and accessed via multiple front-end clients, may be unacceptable because it may suffer from multiple hardware and software bottlenecks at the single server, the load on which may increase rapidly as the contact center increases in size.

Thus, there is a need for a scalable system for maintaining contact center state information.

SUMMARY

The present invention relates to a system and/or a method of monitoring and aggregating state information for directory numbers (DNs) and agents, which are objects in an exemplary contact center. Device controllers and call controllers monitor the devices and calls in the contact center, respectively, and relay state update information to data aggregation nodes, which aggregate and share the data, to form full DN state and agent state information. The distributed architecture allows the system to be scaled in size without hindrance from performance bottlenecks.

According to an embodiment of the present invention there is provided a system, including: a plurality of controllers configured to generate data updates for a plurality of contact center objects, the contact center objects including a plurality of directory numbers and a plurality of agents; a plurality of data aggregation nodes; each data aggregation node in a first subset of the plurality of data aggregation nodes being configured to: monitor one or more of the plurality of controllers; and maintain partial directory number state information received from the controllers monitored by the data aggregation node; and each data aggregation node in a second subset of the plurality of data aggregation nodes being configured to: merge partial directory number state information obtained from data aggregation nodes of the first plurality of data aggregation nodes to form aggregated directory number state information.

In one embodiment, the aggregated directory number state information is partially aggregated directory number state information.

In one embodiment, each data aggregation node in the second subset of the plurality of data aggregation nodes is configured to: own one or more of the plurality of directory numbers; and merge partial directory number state information obtained from data aggregation nodes of the first subset of the plurality of data aggregation nodes to form full directory number state information for the directory numbers owned by the data aggregation node.

In one embodiment, the data aggregation nodes are processes configured to be executed on a plurality of server processors.

In one embodiment, the plurality of controllers includes a plurality of call controllers.

In one embodiment, the plurality of controllers includes a plurality of device controllers.

In one embodiment the system further includes a publish-subscribe bus, wherein each data aggregation node of the first plurality of data aggregation nodes is configured to publish publications of partial directory number state information to the publish-subscribe bus under a topic for partial directory number state information and each data aggregation node of the second plurality of data aggregation nodes is configured to subscribe to the publish-subscribe bus under a topic for partial directory number state information, with a filter condition selected to be satisfied by any publication for any of the directory numbers owned by the node.

In one embodiment, the publish-subscribe bus includes storage space in shared memory.

In one embodiment, the data aggregation nodes of the first plurality of data aggregation nodes are publishers to the publish-subscribe bus; the data aggregation nodes of the second plurality of data aggregation nodes are subscribers to the publish-subscribe bus; and the publish-subscribe bus includes a message broker configured to distribute publications to subscribers according to the results of the application of subscriber filter conditions to publications provided by publishers.

In one embodiment, each publication includes a field identifying the directory number for which the publication contains partial state information.

In one embodiment, each data aggregation node in a third subset of the plurality of data aggregation nodes is configured to: own one or more of the plurality of agents; and merge agent state information components obtained from data aggregation nodes of the second plurality of data aggregation nodes to form agent state information for the agents owned by the data aggregation node.

In one embodiment, each data aggregation node of the second plurality of data aggregation nodes is configured to publish publications of partial directory number state information to the publish-subscribe bus under a topic for full directory number state information and each data aggregation node of the third plurality of data aggregation nodes is configured to subscribe to the publish-subscribe bus under a topic for full directory number state information, with a first filter condition, wherein the first filter condition is selected to be satisfied by publications for directory numbers for which the agent currently logged in is an agent owned by the data aggregation node.

In one embodiment, each data aggregation node of the third plurality of data aggregation nodes is further configured to subscribe to the publish-subscribe bus under a topic for full directory number state information, with a second filter condition, wherein the second filter condition is selected to be satisfied by publications for directory numbers, the agent most recently logged in to which is an agent owned by the data aggregation node.

In one embodiment, the publish-subscribe bus includes storage space in shared memory.

In one embodiment, the publish-subscribe bus includes a message broker configured to distribute publications to subscribers according to the results of the application of subscriber filter conditions to publications provided by publishers.

In one embodiment, each publication includes: field identifying the directory number for which the publication contains full state information; a field identifying the agent currently logged in to the directory number; and a field identifying the agent most recently logged in to the directory number.

In one embodiment, each data aggregation node of the first plurality of data aggregation nodes is configured to publish publications of partial directory number state information to the publish-subscribe bus under a topic for partial directory number state information; each data aggregation node of the second plurality of data aggregation nodes is configured to subscribe to the publish-subscribe bus under a topic for partial directory number state information, with a filter condition selected to be satisfied by any publication for any of the directory numbers owned by the node; each data aggregation node of the second plurality of data aggregation nodes is configured to publish publications of partial directory number state information to the publish-subscribe bus under a topic for full directory number state information; and each data aggregation node of the third plurality of data aggregation nodes is configured to subscribe to the publish-subscribe bus under a topic for full directory number state information, with a first filter condition; wherein the first filter condition is selected to be satisfied by publications for directory numbers for which the agent currently logged in is an agent owned by the data aggregation node.

In one embodiment, each data aggregation node of the third plurality of data aggregation nodes is further configured to subscribe to the publish-subscribe bus under a topic for full directory number state information, with a second filter condition, wherein the second filter condition is selected to be satisfied by publications for directory numbers, the agent most recently logged in to which is an agent owned by the data aggregation node.

In one embodiment, the publish-subscribe bus includes storage space in shared memory.

In one embodiment, the publish-subscribe bus includes a message broker configured to distribute publications to subscribers according to the results of the application of subscriber filter conditions to publications provided by publishers.

According to another embodiment of the present invention there is provided a system, including: a plurality of controllers configured to generate data updates for a plurality of contact center objects, the contact center objects including a plurality of directory numbers and a plurality of agents; means for collecting partial directory number state information; means for aggregating directory number state information; and means for communication between the means for collecting partial directory number state information and the means for aggregating directory number state information.

According to another embodiment of the present invention there is provided a method, including: instantiating, by one or more servers, a plurality of call controllers; and a plurality of data aggregation nodes; obtaining, by a data aggregation node, first partial directory number state information from a first call controller; publishing, by a data aggregation node, the first partial directory number state information on a publish-subscribe bus; obtaining, by a data aggregation node, second partial directory number state information from a second call controller; publishing, by a data aggregation node, the second partial directory number state information on the publish-subscribe bus; obtaining, by a data aggregation node, the first partial directory number state information from the publish-subscribe bus; obtaining, by a data aggregation node, the second partial directory number state information from the publish-subscribe bus; merging, by a data aggregation node, the first partial directory number state information and the second partial directory number state information; publishing, by a data aggregation node, full directory number state information on the publish-subscribe bus; and forming, by a data aggregation node, full directory number state information and agent state information.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a method of distributed maintenance of contact center state provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
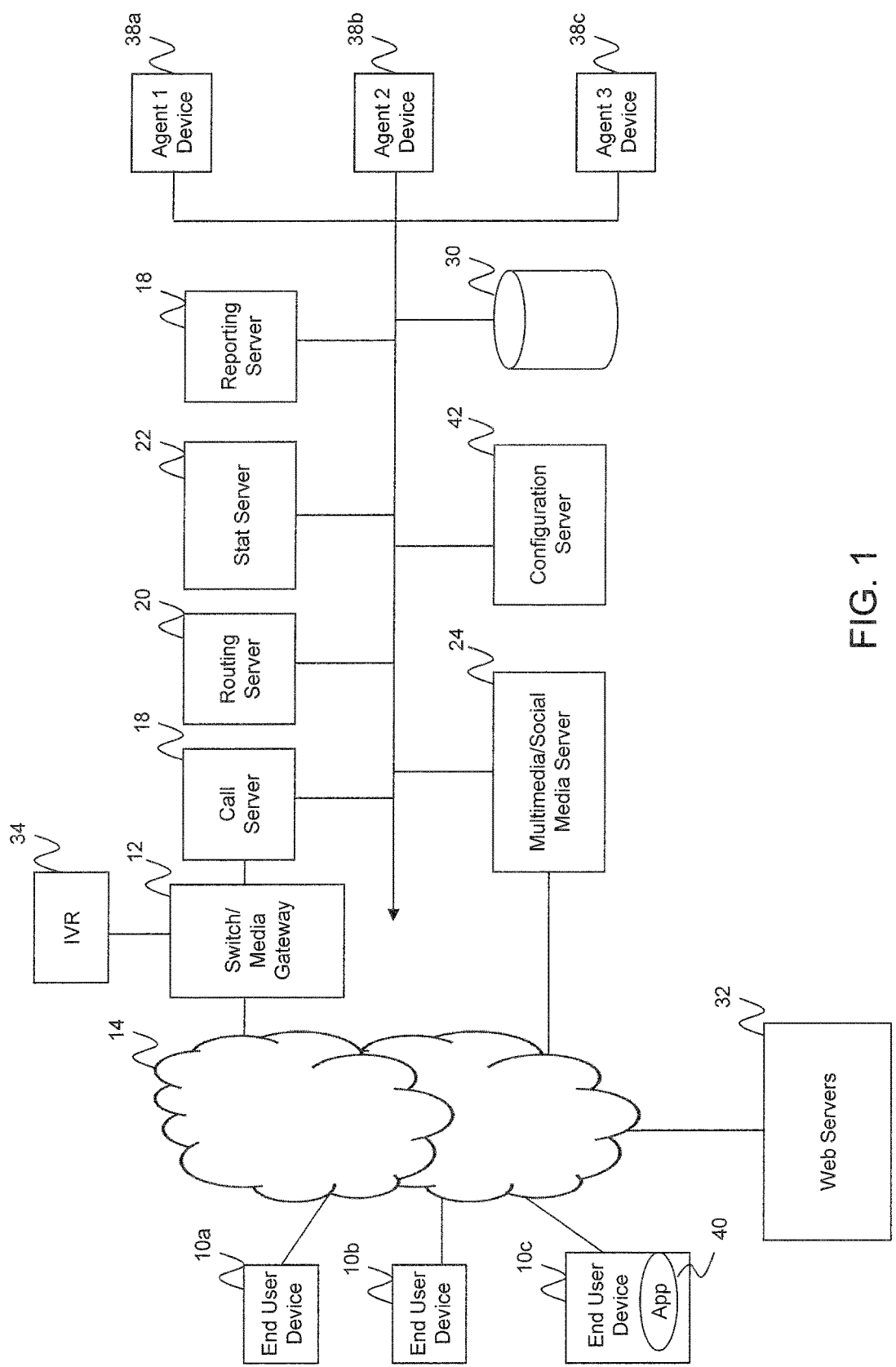
FIG. 1 is a block diagram of elements in an exemplary contact center according to an embodiment of the present invention.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. The mechanisms of contact in a call, and the corresponding user devices 10, need not be limited to real-time voice communications as in a traditional telephone call, but may be non-voice communications including text, video, and the like, and may include email or other non-real-time means of communication. Thus the term "call" as used herein is not limited to a traditional telephone call but is a generalized term including any form of communication in which a contact center may participate.

Inbound and outbound calls from and to the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls and/or data between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch/media gateway 12 and the remainder of the routing, monitoring, and other call-handling systems of the contact center.

The contact center may also include a multimedia/social media server 24, which may also be referred to as an interaction server, for engaging in media interactions other than voice interactions with the end user devices 10 and/or web servers 32. The media interactions may be related, for example, to email, chat, text-messaging, web, social media, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls. In another exemplary embodiment, the call server may include a telephony server (T-server) to, for example, translate one protocol to another protocol for use in the system.

In one example, while an agent is being located and until such agent becomes available, the call server may place the call in a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to the corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations. The selection of an appropriate agent for routing an inbound call may be based, for example, on a routing strategy employed by the routing server 20, and further based on information about agent availability, skills, and other routing parameters provided, for example, by a statistics server 22, which may also be referred to as a stat server 22. A person of skill in the art should recognize that the stat server 22 may also be implemented via firmware (e.g. an application-specific integrated circuit), hardware, or a combination of software, firmware, and hardware.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

To store configuration information such as device characteristics and agent attributes, such as agent skill levels, a configuration server 42 may be included in the system. The configuration server 42 may, for example, provide attribute values for objects or processes when these are created, at system startup, or subsequently.

According to one exemplary embodiment of the invention, the contact center also includes a mass storage device 30 for storing data related to contact center operations such as, for example, information related to agents, customers, customer interactions, and the like. The mass storage device may take the form of a hard disk or disk array as is conventional in the art.

Each of the various servers of FIG. 1 may include one or more processors executing computer program instructions and interacting with other system components for performing the various functionalities described herein. The computer program instructions are stored in a memory which may be implemented in the server using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the exemplary embodiments of the present invention.

Figure 2:
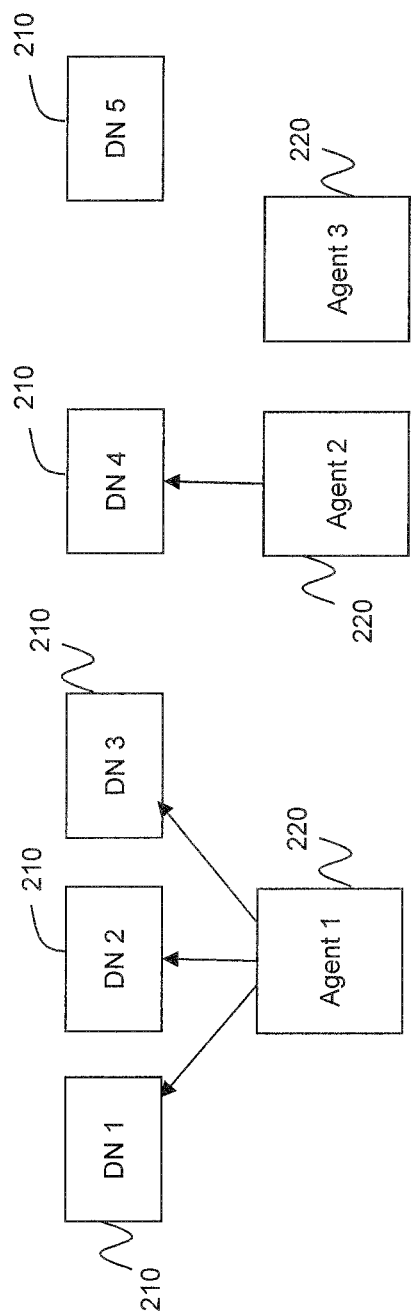
FIG. 2 is a block diagram of agents logged in, or not logged in, to directory numbers according to an embodiment of the present invention.

Referring to FIG. 2, in one exemplary embodiment of the present invention, a contact center may have two types of contact center objects: directory numbers (DNs) 210 and agents 220 corresponding to respective agent identification numbers. An agent 220 may be logged out, i.e., not associated with any DN 210, or logged into one or more DNs 210. An agent 220 may participate in calls. The relationship between DNs 210 and calls is many-to-many, i.e., one DN 210 can simultaneously or concurrently participate in multiple calls, and multiple DNs 210 can participate in a single call.

Figure 3:
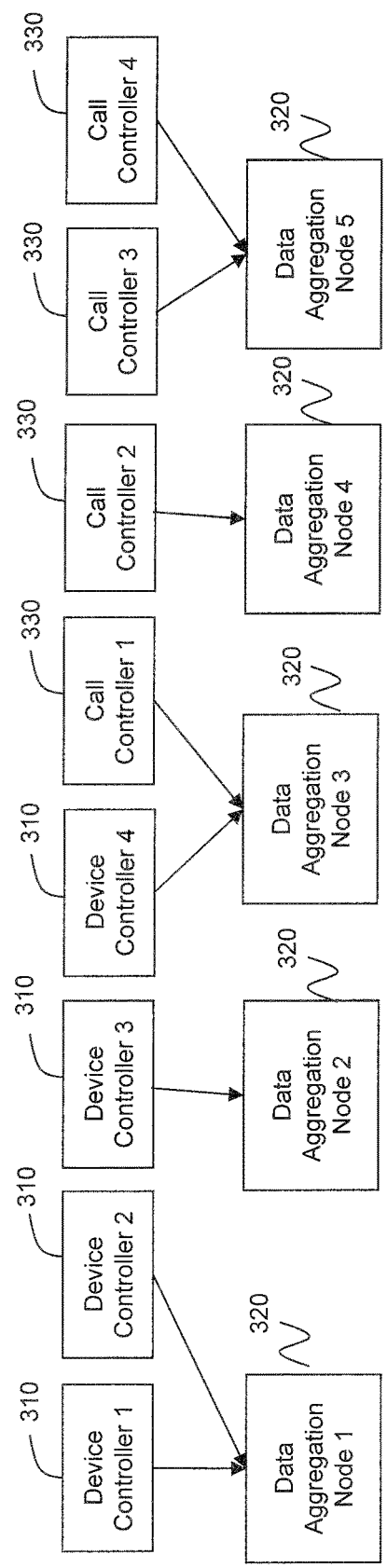
FIG. 3 is a block diagram of data aggregation nodes connected to device controllers and call controllers according to an embodiment of the present invention.

Information about the contact center can be obtained by connection to data-sources, which may be referred to as controllers, which may be instantiated by the call server 18 (FIG. 1). Referring to FIG. 3, two types of controllers may be implemented: call controllers 330 and device controllers 310. A device controller 310 may report the state of one or more devices; this state may include whether an agent is logged in, whether the device is on hook, and whether the device is ready. Call controllers 330 may report information on calls. Both types of controller act as servers and the information reported may be made available to clients which may connect to the controllers 310, 330.

Such clients may include data aggregation nodes 320. In one exemplary embodiment, the data aggregation nodes 320 may reside in, or be instantiated by, the stat server 22 (FIG. 1). The stat server may be one or more processes executing on one or more processors. The state of any DN may not be available from any single controller, and, in one exemplary embodiment, the device controllers 310 and call controllers 330 are each monitored by at least one data aggregation node, to obtain the full state of a DN.

This monitoring of all controllers may be accomplished as follows. The monitoring system may be implemented as a distributed system, connected to the controllers. The distributed monitoring system may include P data aggregation nodes numbered 1 through P. The following assumptions, labeled (A1) through (A5), are sufficient for the distributed monitoring system, according to one exemplary embodiment, to be scalable:

(A1) All DNs are evenly distributed among the device controllers 310, so that each device controller monitors approximately the same number of DNs as any other device controller, and all calls are evenly distributed among the call controllers 330, so that at any time, each call controller 330 is monitoring approximately the same number of calls as any other call controller;

(A2) each controller 310, 330 is monitored by one data aggregation node 320;

(A3) none of the controllers is connected to more than one data aggregation node;

(A4) if multiple monitoring data aggregation nodes are connected to the same call controller, the latter is capable of load-balancing calls between multiple monitoring data aggregation nodes; (this assumption justifies assumption A3);

(A5) each contact center object is owned by one data aggregation node. In this context, ownership implies an exclusive association, in which each contact center object has one and only one data aggregation node that is its owner.

Although the above assumptions are sufficient for scalability, they are not necessary, and they may not be true in some embodiments of the present invention. For example, if a device controller is executing on a particularly powerful processor, it may monitor a larger number of DNs than another device controller executing on a less powerful processor. Moreover, in one embodiment, high availability (HA) may be achieved in part by instantiating multiple agent-owner nodes for each agent for redundancy.

In one exemplary embodiment a static hash function may be used to associate each DN with the data aggregation node owning the DN, and a separate static hash function may be used to associate each agent with the data aggregation node owning the agent. In one exemplary embodiment, a single static hash function may be used to associate all contact center objects, i.e., all agents and DNs, with their respective owner nodes. Each data aggregation node is responsible for maintaining the state of each contact center object that it owns.

Figure 4A:
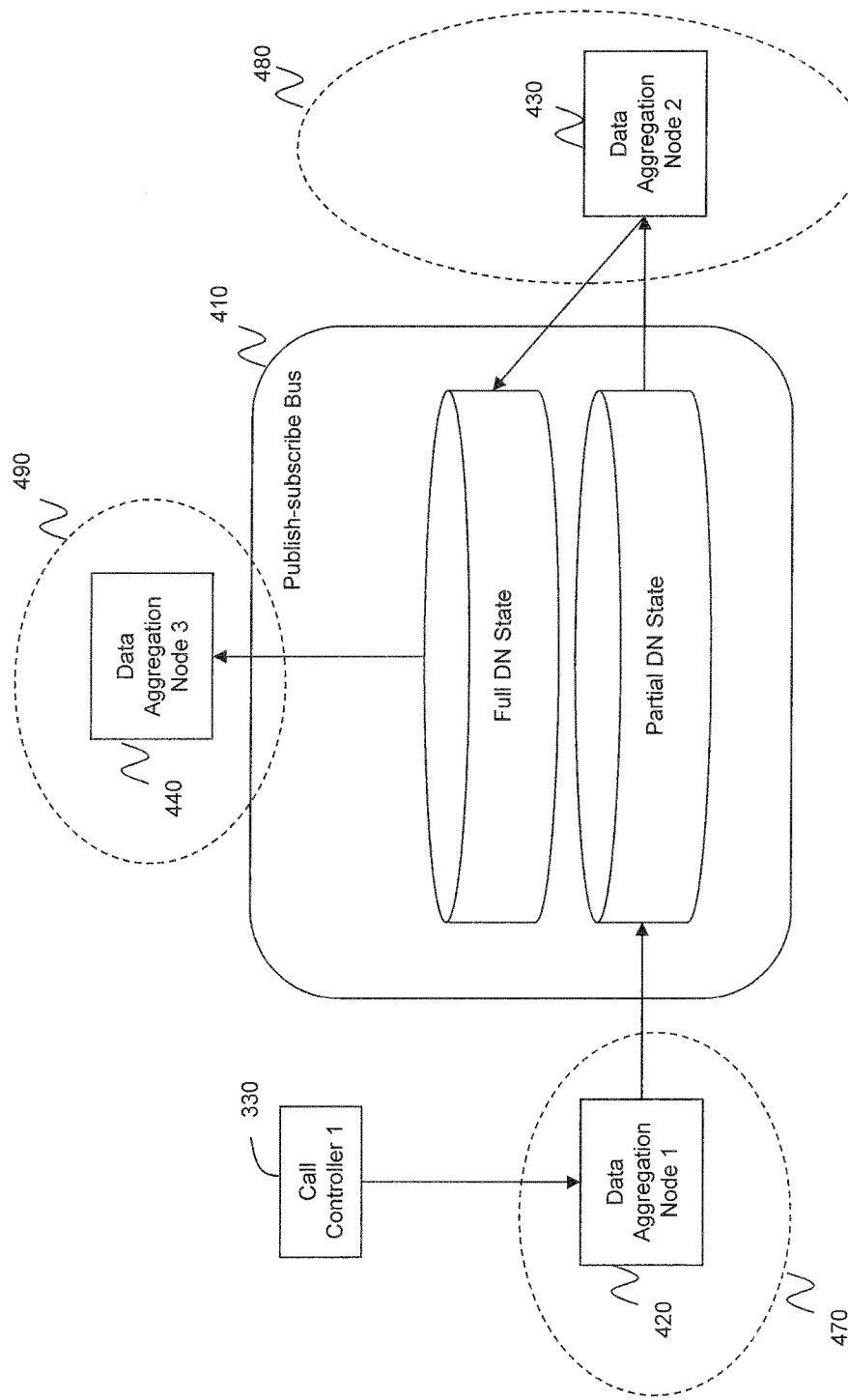
FIG. 4A is a block diagram of data aggregation nodes in three different roles with respect to an exemplary call controller and a publish-subscribe bus according to an embodiment of the present invention.

Some of the information that a contact center object owner data aggregation node is responsible for maintaining may not be available from any of the controllers to which the node is connected. In this case, the contact center object owner data aggregation node may obtain the information from another data aggregation node, to enable the contact center object owner data aggregation node to maintain the necessary state information. Referring to FIG. 4A, this can be accomplished by connecting the data aggregation nodes 420, 430, 440 together via a topic-based publish-subscribe bus 410.

This publish-subscribe bus 410 may have a topic for partial DN state and a topic for full DN state, where, as used herein, "topic" identifies a data set conceptually analogous to a table in a relational database. Publication to the topic may take the form of operations analogous to operations executed to change the contents of such a table, including for example the operations (i) add tuple, (ii) update tuple, and (iii) remove tuple. Each published tuple may have a unique key. Any data aggregation node 430, 440 subscribing to either topic may provide one or more filter conditions, for the purpose of configuring the publish-subscribe bus to send it all publications satisfying the filter conditions.

All data aggregation nodes potentially may publish on the topic of partial DN state. Tuples which contain partial state information for a DN may be in the form Publisher_id,
Owner_id,
DN_id, and
<partial DN state>, with a unique key given by {publisher_id, DN_id}. A DN-owner data aggregation node 430, i.e., the data aggregation node which owns a particular DN, may subscribe to the topic, giving as the filter condition Owner_id=<self>, i.e., DN-owner data aggregation node 430 will receive all publications containing partial state information for any DN for which it is itself the owner. In one exemplary embodiment, when a data aggregation node initially subscribes to the publish-subscribe bus 410, it may receive an archive of all publications published to the topic satisfying its filter condition. Subsequently it will receive publications, i.e., tuples, corresponding to any further publication operations, each of which may affect the state it maintains for the DN.

An agent-owner data aggregation node 440, i.e., a data aggregation node which owns an agent, may similarly be responsible for maintaining full state information on that agent by merging state information it may receive from the publish-subscribe bus 410, under the topic DN_STATE, which contains full state information for the DNs. Publications of full DN state that the agent-owner data aggregation node 440 may use to obtain and maintain agent state information may take the following form:

DN_id,
Agent_id,
Prev_Agent_ID,
Agent_owner_node_id,
Prev_agent_node_id, and
<full DN state>

They may use the unique key {publisher_id, DN_id}.

The agent-owner data aggregation node 440 responsible for maintaining state information for a particular agent may then subscribe with the following filter:

Agent_owner_node_ID=<self>||<Prev_agent_owner_node_ID=<self>, i.e., it will receive publications of full DN state information if it is itself (i) the owner of the agent currently logged in to the DN or (ii) the owner of the agent most recently logged in to the DN. The latter part of the filter condition is useful to prevent loss of agent state information related to a DN immediately after the agent logs out of that DN.

The publishers publishing to the DN_PARTIAL_STATE topic on the publish-subscribe bus 410 are, in one exemplary embodiment, data aggregation nodes connected to call controllers or device controllers, and the publishers publishing to the DN_STATE topic on the publish-subscribe bus 410 are DN-owner data aggregation nodes.

Figure 4B:
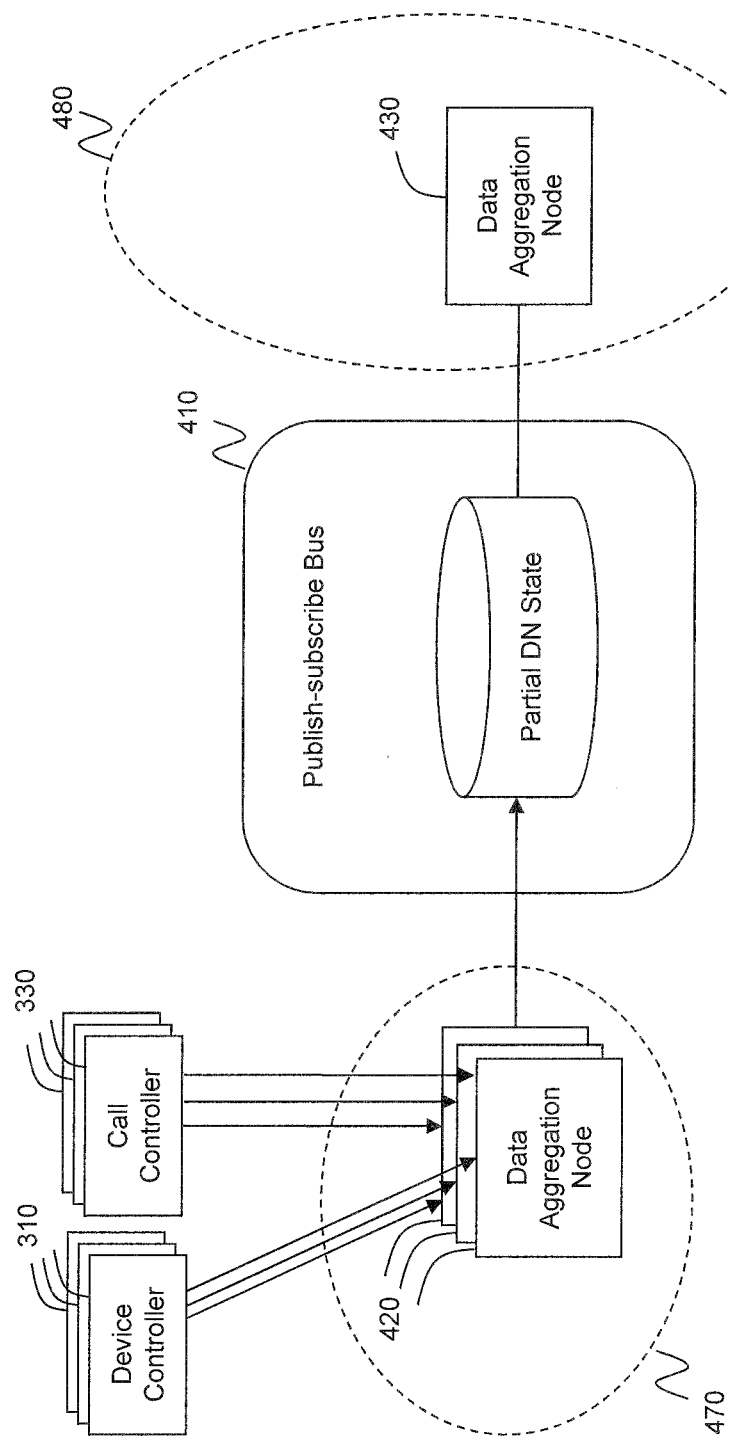
FIG. 4B is a block diagram of data aggregation nodes in two different roles with respect to exemplary device controllers and call controllers and a publish-subscribe bus according to an embodiment of the present invention.
Figure 4C:
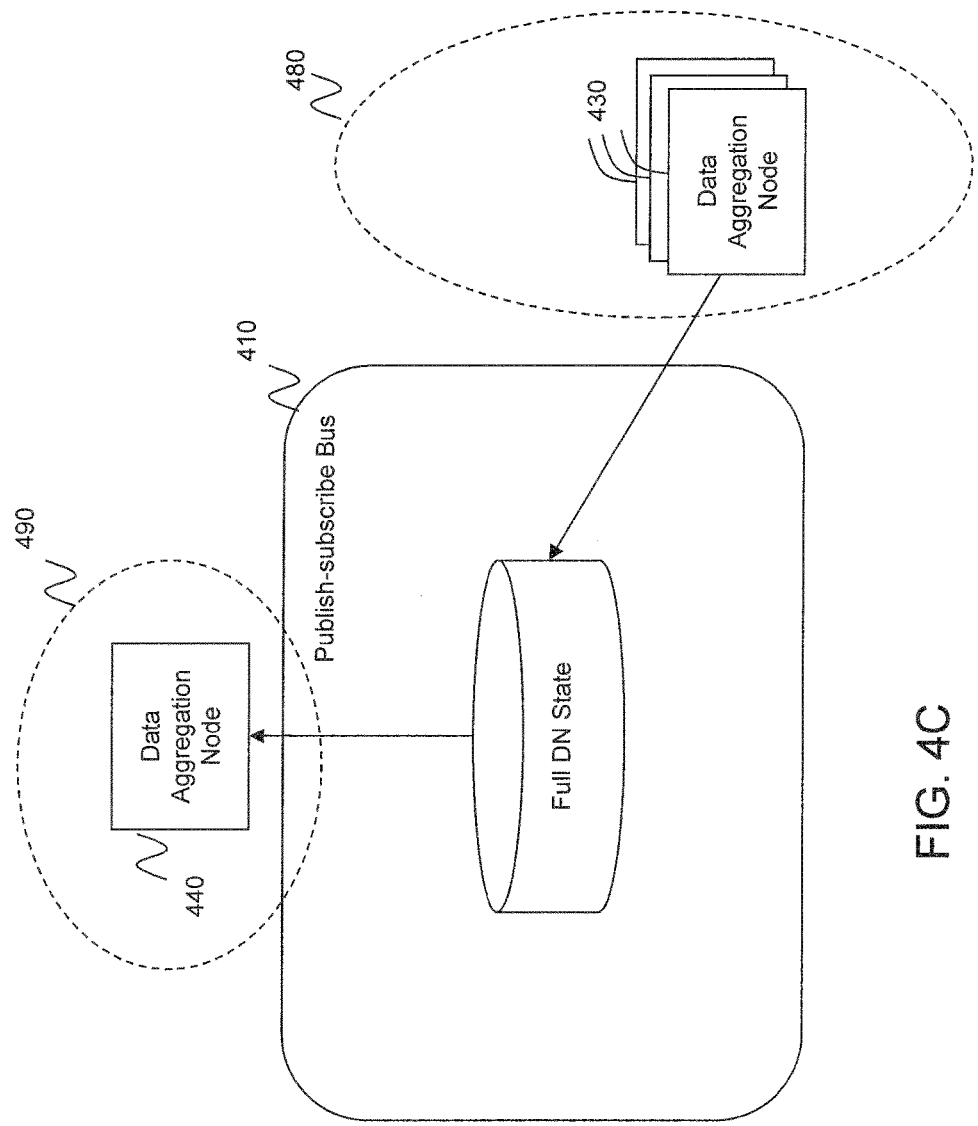
FIG. 4C is a block diagram of data aggregation nodes in two different roles with respect to a publish-subscribe bus according to an embodiment of the present invention.

Although for clarity only one each of the first, second, and third nodes are illustrated in FIG. 4A, the invention is not limited to such a configuration. Referring to FIG. 4B, in general the system may include a plurality of data aggregation nodes 420, each connected to one or more call controllers 330 and/or device controllers 310, and each publishing partial DN state information for one or more DNs to the publish-subscribe bus. A DN-owner data aggregation node 430 may obtain the publications of partial DN state information for a DN it owns by subscribing to the publish-subscribe bus as described above, and it may merge the publications to form full DN state information for the DN. Similarly, referring to FIG. 4C, there may be multiple data aggregation nodes 430, each forming and publishing full DN state information which they may publish to the publish-subscribe bus. An agent-owner data aggregation node 440 may obtain publications of full DN state information relevant for an agent it owns, and merge the publications to form agent state information for the agent. In general, multiple agent-owner data aggregation nodes 440 may, in a similar manner, each form agent state information for one or more agents.

Moreover, the various categories of data aggregation nodes need not be distinct: a given data aggregation node may be (i) connected to one or more call controllers, (ii) connected to one or more device controllers, (iii) a DN-owner data aggregation node, (iv) an agent owner data aggregation node, or any combination of (i) through (iv). The data aggregation nodes 420, 430, and 440 may, in an exemplary embodiment, be distributed processes running on separate processors 470, 480, and 490.

In one exemplary embodiment, when a data aggregation node 420 which is not the owner of a particular DN receives an event about the DN from a device controller or from a call controller, it recalculates the partial state information of the DN that it maintains locally and publishes it into DN_PARTIAL_STATE. The data aggregation node 430 which is the owner of the DN aggregates the partial state information published by other data aggregation nodes 420 to calculate the full DN state information, which it then publishes. This calculation can be represented symbolically $$DN_{state} = DN_{partial\ state}^{1} \oplus \ldots \oplus DN_{partial\ state}^{p},$$

where $\oplus$ is the partial DN state merge operation.

Similarly, when an agent-owner data aggregation node 440 receives a publication (e.g., add, update, or remove) about changes in the full DN state of a DN to which its agent is logged in, it recalculates the agent state based on the set of existing full DN states, an operation which can be written $$Agent_{state} = DN_{state}^{1} \odot \ldots \odot DN_{state}^{p}$$

where ⊙ is the merge operation performed by the agent-owner data aggregation node 440.

In one exemplary embodiment, the publish-subscribe bus may comprise a message broker. A data aggregation node publishing to the DN_PARTIAL_STATE topic or to the DN_STATE topic may send a message to the message broker, which may store it, and also forward it to all subscribers for which the message meets the criteria of the subscriber's filter. Each subscriber may provide one or more filters to the message broker when subscribing. The message broker may store the data in shared memory so that it is readily accessible to processes on any processor having access to the shared memory. The message broker may use the unique key in each tuple to avoid duplicates in the stored data. In another exemplary embodiment, the publish-subscribe bus may include the logical equivalent of a message broker without including a separate and distinct software entity performing that function. In such an exemplary embodiment the functions of the message broker may be implemented using operating system primitives including semaphores and mutexes.

To summarize, referring to FIG. 4A, in one exemplary embodiment the three data aggregation nodes illustrated may play different and cooperative roles in aggregating and maintaining full DN state information and agent state information. A first data aggregation node 420 may be connected to a call controller from which it obtains information relevant for both agent states and DN states. In another exemplary embodiment, the first data aggregation node 420 may instead, or in addition, be connected to a device controller, from which it may obtain information relevant for both agent states and DN states. The first data aggregation node 420 calculates updates to partial DN states and publishes them on the publish-subscribe bus 420. A second data aggregation node 430 may be the owner of a DN and, accordingly, may subscribe to all publications relevant to that DN, and aggregate the publications of partial DN state, to maintain the full DN state. It may publish the full DN state each time it changes. The full DN state may contain components of the agent state, so that an agent-owner data aggregation node 440 may subscribe to publications of the DN state, for all DNs to which its agent is logged in, to maintain full agent state for the agent it owns.

Figure 5:
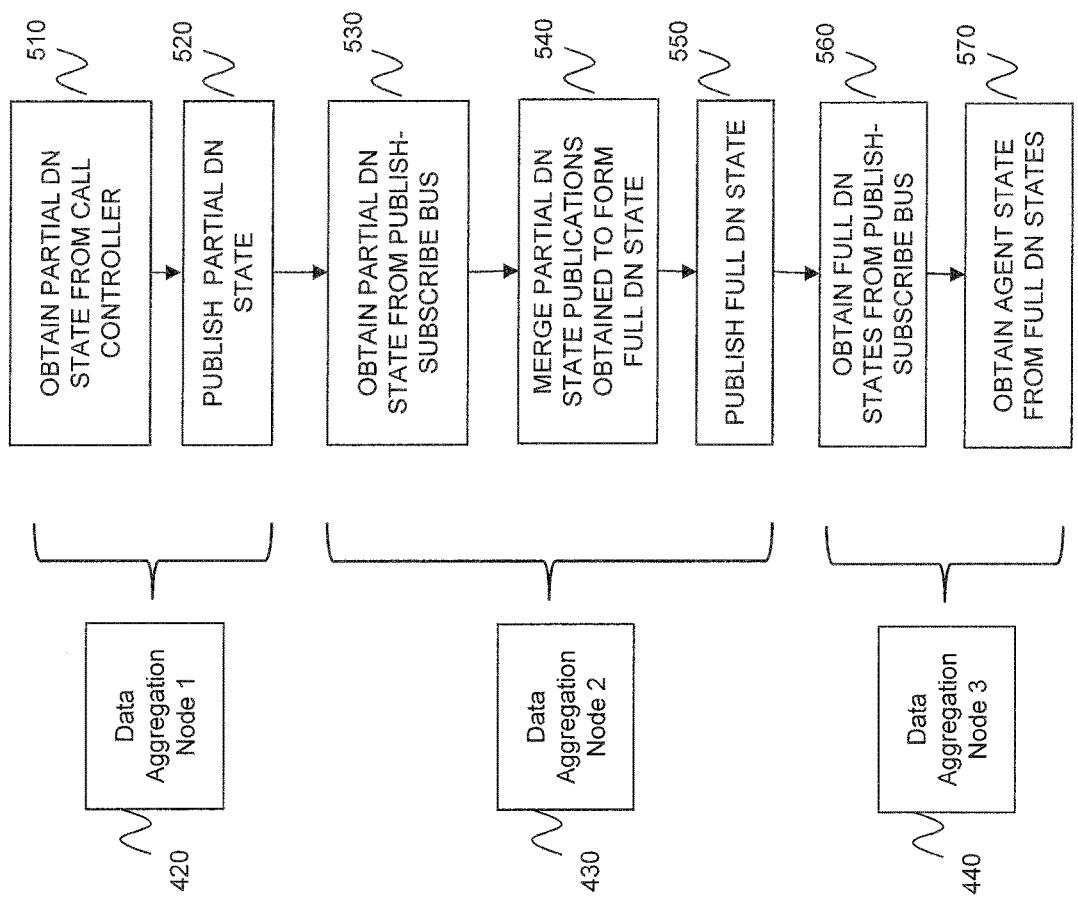
FIG. 5 is a flowchart illustrating the steps for aggregating full directory number state information and agent state information according to an embodiment of the present invention.

Referring also to FIG. 5, the sequence of steps for forming full DN state information for an exemplary DN, and full agent state information for an exemplary agent, may in one exemplary embodiment be summarized as follows. In a first step 510, a first data aggregation node 420 obtains partial DN state information for the exemplary DN from one or more call controllers. In another exemplary embodiment, the first data aggregation node 420 may instead, or in addition, be connected to a device controller, from which it may obtain information relevant for both agent states and DN states. In step 520, the first data aggregation node 420 publishes the partial DN state information under the topic DN_PARTIAL_STATE. In step 530, a second data aggregation node 430, which is the DN-owner data aggregation node owning the exemplary DN, and which has subscribed to the topic DN_PARTIAL_STATE with a filter selecting publications relevant to the exemplary DN, obtains the partial DN state information, and also obtains partial DN state information published by other data aggregation nodes. This data aggregation node 430 merges the partial DN state information it obtains into full DN state, and publishes it, in step 550, to the publish-subscribe bus, under the topic DN_FULL_STATE.

Subsequently, a third data aggregation node 440, which is an agent-owner data aggregation node which has subscribed to the topic DN_STATE with appropriate filters receives, in step 550, publications of full DN state for all DNs to which the agent it owns is logged in, or was recently logged in. A suitable filter is one which communicates a publication to the subscribing agent-owner data aggregation node if the agent it owns is either currently logged in to the DN or was the most recent agent logged in to the DN. From the full DN state of all DNs to which its agent is logged in or was recently logged in, the agent-owner data aggregation node is able to assemble, by merging information from the publications it receives, the agent state.

Figure 6:
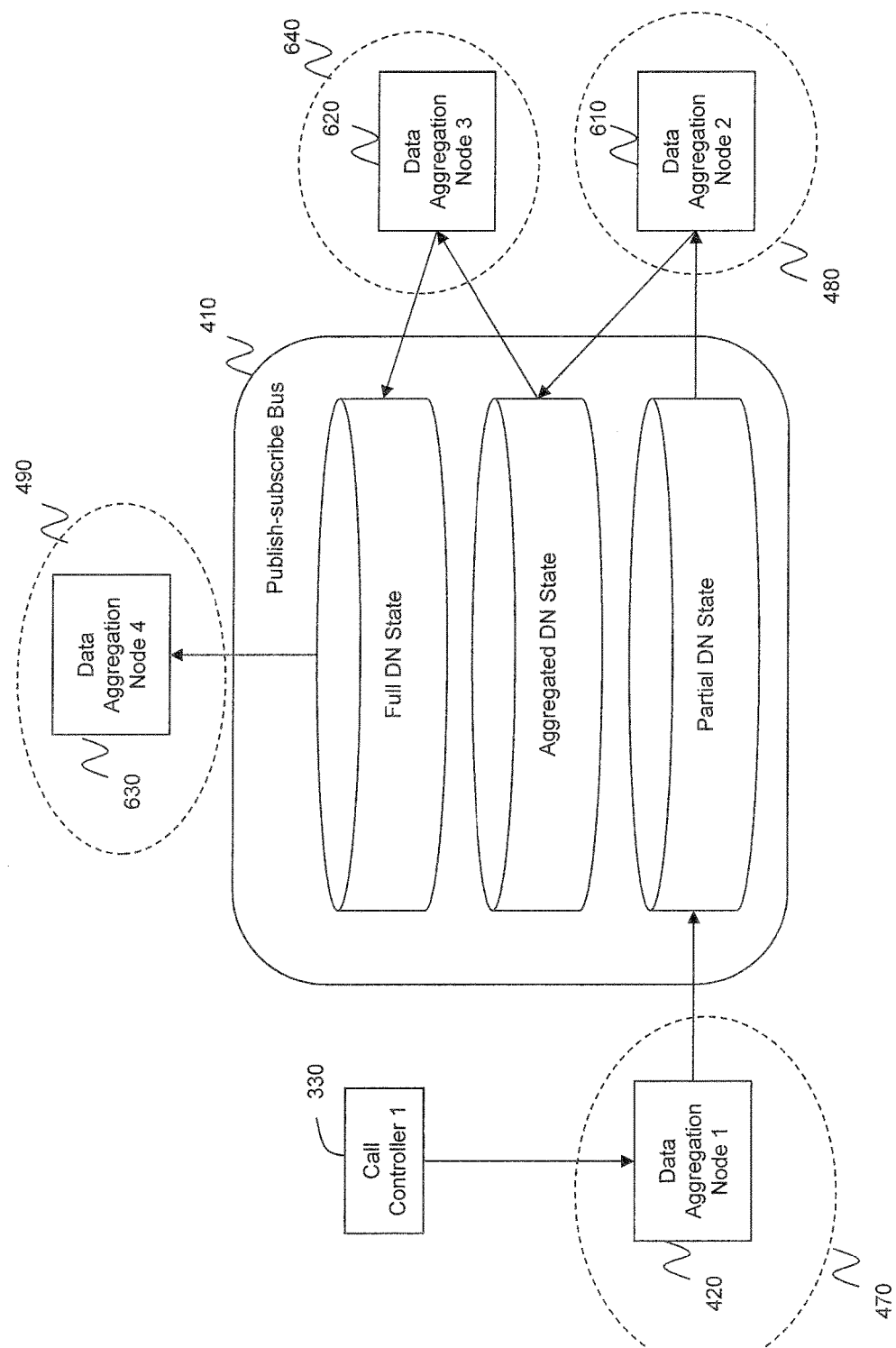
FIG. 6 is a block diagram of data aggregation nodes in four different roles with respect to an exemplary call controller and a publish-subscribe bus according to an embodiment of the present invention.

In one embodiment, data aggregation may take place in a larger number of stages, or layers, than those of the embodiment illustrated in FIG. 4A. Referring to FIG. 6, partial DN state information may be obtained from the publish-subscribe bus 410 by a second data aggregation node 610 which may aggregate DN state information but which need not aggregate full DN state information. This DN state information aggregated by the second data aggregation node 610 may be referred to as aggregated DN state information. Aggregated DN state information may be full DN state information, or it may be less than full DN state information, which may be referred to as partially aggregated DN state information. A third data aggregation node 620 may then combine aggregated DN state information into full DN state information, and a fourth data aggregation node 630 may then obtain and maintain agent state information. The various data aggregation nodes may be instantiated by and execute on one server or they may be instantiated by separate servers 470, 480, 640, and 490, as illustrated in FIG. 6. In another embodiment, there may be more than the one intermediate aggregation level shown and designated in FIG. 6 as aggregated DN state, viz. there may be multiple levels of aggregated DN state information, each level containing DN state information absent from the lower levels.

The embodiment illustrated in FIG. 4A may then be considered to be a special case of the embodiment of FIG. 6, in which the aggregated DN state information is full DN state information.

That this architecture is scalable may be seen as follows. The architecture assumes that the scalability assumptions (A1) through (A5) above hold, and that the contract center has, for example, n device controllers and m call controllers.

A monitoring sub-system may be constructed as follows:
  n data aggregation nodes are started (in this instance, the number of data aggregation nodes P is selected for convenience to be equal to the number of device controllers, i.e., P=n)
  Each data aggregation node is connected to a single device controller (with no duplicates)
  Each data aggregation node is connected to all m call controllers.

The communication with device controllers may be ignored, assuming that it is negligible compared to that with the call controllers. In particular, this approximation is made with regards to linear scalability for treating input/output and processing load. There may be many more events and much more traffic coming from call controllers than from device controllers.

$P(\Omega)$ may be used to denote the probability of the event $\Omega$ that monitoring node $N_i$ will be affected by some call C. Then $$P(\Omega) = P(\Omega_1) + P(\Omega_2),$$

where $\Omega_1$ is the event that $N_i$ is assigned the call C, and $\Omega_2$ is the event that $N_j$ is assigned the call C, with, $j \neq i$ and that $N_i$ is affected (through the publish-subscribe bus).

As a result of scalability assumptions A3 and A4, $$(\Omega_1) \sim \frac{1}{n}.$$

Next, $P(\Omega_2)=P(\Omega_3 \cup \Omega_4)$ where $\Omega_3$ is the event that $N_i$ owns the DN from the call C and where $\Omega_4$ is the event that $N_i$ owns the agent of the DN from the call C. Using probability rules and the independence of $\Omega_3$ and $\Omega_4$, it follows that $$P(\Omega_2)=P(\Omega_3)+P(\Omega_4)-P(\Omega_3)\times P(\Omega_4).$$

Then, as a result of scalability condition (A5), $$P(\Omega_3) \sim \frac{1}{n} \text{ and } P(\Omega_4) \sim \frac{1}{n},$$

and the probability of the event $\Omega$ is found to be $$P(\Omega) \sim \frac{1}{n}.$$

This demonstrates the linear scalability of the architecture disclosed herein.

It should be appreciated from the above that the various structures and functions described herein may be incorporated into a variety of apparatuses (e.g., a stat server, a call server, etc.) in a contact center and implemented in a variety of ways. Different embodiments of the statistical and/or monitoring systems may include a variety of hardware and software processing components. In some exemplary embodiments, hardware components such as processors, controllers, state machines and/or logic may be used to implement the described components or circuits. In some exemplary embodiments, code such as software or firmware executing on one or more processing devices may be used to implement one or more of the described operations or components.

Although exemplary embodiments of the method of distributed maintenance of contact center state have been specifically described and illustrated herein, many modifications and variations will be apparent to those skilled in the art. Accordingly, it is to be understood that the method of distributed maintenance of contact center state constructed according to principles of this invention may be embodied other than as specifically described herein. The invention is also defined in the following claims, and equivalents thereof.

What is claimed is:

1. A system, comprising:
 one or more processors and associated memory devices, wherein the associated memory devices store instructions that, when executed by the one or more processors, cause the one or more processors to respectively:
  transmit first signals to a plurality of first computing nodes to publish, to a communication bus, first and second partial state information of a first directory number;
  transmit a second signal to a second computing node to:
   receive, from the communication bus, the first and second partial state information of the first directory number; and
   aggregate the first and second partial state information of the first directory number to generate first aggregated directory number state information;
  transmit a third signal to a third computing node to:
   receive, from the communication bus, the first aggregated directory number state information of the first directory number and aggregated state information for each of a plurality of other directory numbers corresponding to an agent; and
   determine state information for the agent based on the first aggregated directory number state information and the aggregated state information for each of the plurality of other directory numbers corresponding to the agent;
  output the state information for the agent for routing an interaction to the agent; and
 an electronic switch coupled to the one or more processors and configured to establish a communication session with a communication device of the agent in response to the routing of the interaction.

2. The system of claim 1, wherein the first directory number is a telephony number.

3. The system of claim 1, wherein one of the first computing nodes, the second computing node, and the third computing node is in electronic communication with a device controller and a call controller.

4. The system of claim 1, wherein the communication bus comprises a storage space in shared memory of the first, second, and third computing nodes.

5. The system of claim 1, wherein:
 each of the first computing nodes is a publisher to the communication bus;
 the second computing node is a subscriber to the communication bus; and
 the communication bus is a publish-subscribe bus comprising a message broker configured to distribute publications to subscribers according to results of application of filter conditions of the subscribers.

6. The system of claim 5, wherein each publication to the communication bus by one of the first computing nodes comprises a field identifying a corresponding directory number for which the publication includes partial state information.

7. The system of claim 1, wherein the second computing node is configured to publish publications of the first aggregated directory number state information to the communication bus under a topic for aggregated directory number state information.

8. The system of claim 1, wherein the third computing node is configured to subscribe to the communication bus under a topic for aggregated directory number state information based on one or more filter conditions.

9. A method comprising:
 transmitting, by one or more processors, first signals to a plurality of first computing nodes to publish, to a communication bus, first and second partial state information of a first directory number;
 transmitting, by the one or more processors, a second signal to a second computing node to:
  receive, from the communication bus, the first and second partial state information of the first directory number; and
  aggregate the first and second partial state information of the first directory number to generate first aggregated directory number state information;
 transmitting, by the one or more processors, a third signal to a third computing node to:
  receive, from the communication bus, the first aggregated directory number state information of the first directory number and aggregated state information for each of a plurality of other directory numbers corresponding to an agent; and
  determine state information for the agent based on the first aggregated directory number state information and the aggregated state information for each of the plurality of other directory numbers corresponding to the agent;

outputting, by the one or more processors, the state information for the agent for routing an interaction to the agent; and transmitting, by the one or more processors, a fourth signal to an electronic switch to establish a communication session with a communication device of the agent in response to the routing of the interaction.

10. The method of claim 9, wherein the first directory number is a telephony number.

11. The method of claim 9, wherein one of the first computing nodes, the second computing node, and the third computing node is in electronic communication with a device controller and a call controller.

12. The method of claim 9, wherein the communication bus comprises a storage space in shared memory of the first, second, and third computing nodes.

13. The method of claim 9, wherein:
each of the first computing nodes is a publisher to the communication bus;
the second computing node is a subscriber to the communication bus; and
the communication bus is a publish-subscribe bus comprising a message broker configured to distribute publications to subscribers according to results of application of filter conditions of the subscribers.

14. The method of claim 13, wherein each publication to the communication bus by one of the first computing nodes comprises a field identifying a corresponding directory number for which the publication includes partial state information.

15. The method of claim 9, wherein the second computing node is configured to publish publications of the first aggregated directory number state information to the communication bus under a topic for aggregated directory number state information.

16. The method of claim 9, wherein the third computing node is configured to subscribe to the communication bus under a topic for aggregated directory number state information based on one or more filter conditions.

* * * * *